US005823786A

United States Patent [19]

Easterbrook

[11] Patent Number: 5,823,786

[45] Date of Patent: Oct. 20, 1998

[54] SYSTEM FOR INSTRUCTION OF A PUPIL

[76] Inventor: Norman John Easterbrook, Lot 100 Princes Highway, Yallah, Australia, 2530

[21] Appl. No.: 912,146

[22] Filed: Aug. 15, 1997

Related U.S. Application Data

[63] Continuation of Ser. No. 532,738, Dec. 18, 1995, abandoned.

[30] Foreign Application Priority Data

| | | | |
|---|---|---|---|
| Aug. 24, 1993 | [AU] | Australia | PM 0792 |
| Sep. 16, 1993 | [AU] | Australia | PM 1268 |

[51] Int. Cl.[6] .......... A63B 69/00; A63B 69/36

[52] U.S. Cl. .......... 434/247; 434/252

[58] Field of Search .......... 434/247

[56] References Cited

U.S. PATENT DOCUMENTS

| | | | |
|---|---|---|---|
| 3,408,750 | 11/1968 | McCullough et al. | 434/252 |
| 4,828,500 | 5/1989 | Seidel et al. | 434/247 |
| 4,891,748 | 1/1990 | Mann | 364/410 |

*Primary Examiner*—Richard J. Apley
*Assistant Examiner*—John Edmund Rovnak
*Attorney, Agent, or Firm*—Gregory J. Nelson

[57] ABSTRACT

A system for instruction of a pupil is disclosed. The system includes at least one video monitor which preferably has a split screen facility, to display in a comparing relationship instructor and pupil images. A mixer is provided to receive a recorded tutor image of an instructor and at least one recording camera is provided to record live a pupil image as the pupil watches the monitor. The output of the camera is connected to the mixer and displayed on the monitor simultaneously with the image of the instructor.

18 Claims, 8 Drawing Sheets

SYSTEM FOR INSTRUCTION OF A PUPIL

This application is a continuation of application Ser. No. 08/532,738 filed on Dec. 18, 1995, abandoned.

The present invention relates to the instruction of pupils and, in particular, to a system for instruction which enables a pupil to view himself compared to a tutor image.

BACKGROUND ART

For example, when a pupil is being taught golf or a like sport, whether the pupil is a learner, an advanced golfer or a professional, comprehension is often lost due to the inability of the pupil to visualise himself whilst performing a task. When a pupil is learning from books, illustrations, video or personal lessons, the pupil cannot see himself doing what he sees in others. The pupil is not able to see a comparison between himself and a desired action when attempting to complete a task in relation to the sport.

SUMMARY OF THE INVENTION

It is an object of the present invention to provide an improved system for instruction of a pupil which substantially overcomes or ameliorates the above mentioned disadvantages.

According to one aspect of the present invention there is disclosed a system for instruction of a pupil, said system comprising at least one display apparatus to display in a comparing relationship tutor and pupil images, a mixer to receive from a first source, at least one recorded tutor image of an instructor or instructors, at least one second source to provide in real-time at least one pupil image of the pupil or pupils as he or they watch(es) said display apparatus and attempt(s) to emulate said instructor(s), and the output of said first and second sources being connected to said mixer and displayed simultaneously as said tutor image(s) and said pupil image respectively on said display apparatus.

Preferably the first source includes an audio track to which the pupil listens in order to receive instructions whilst emulating the instructor.

The system is preferably embodied in an instructional, interactive learning system which is useful in instructions to pupils in industry, medicine, science, arts, acting, speech therapy, sport and the like embracing all related forms of learning, whenever it is possible for the pupil to emulate or copy the actions of an instructor.

BRIEF DESCRIPTION OF THE DRAWINGS

A number of embodiments of the present invention will now be described in reference to the drawings in which.

BEST MODE OF CARRYING OUT THE INVENTION

Figure 1A:
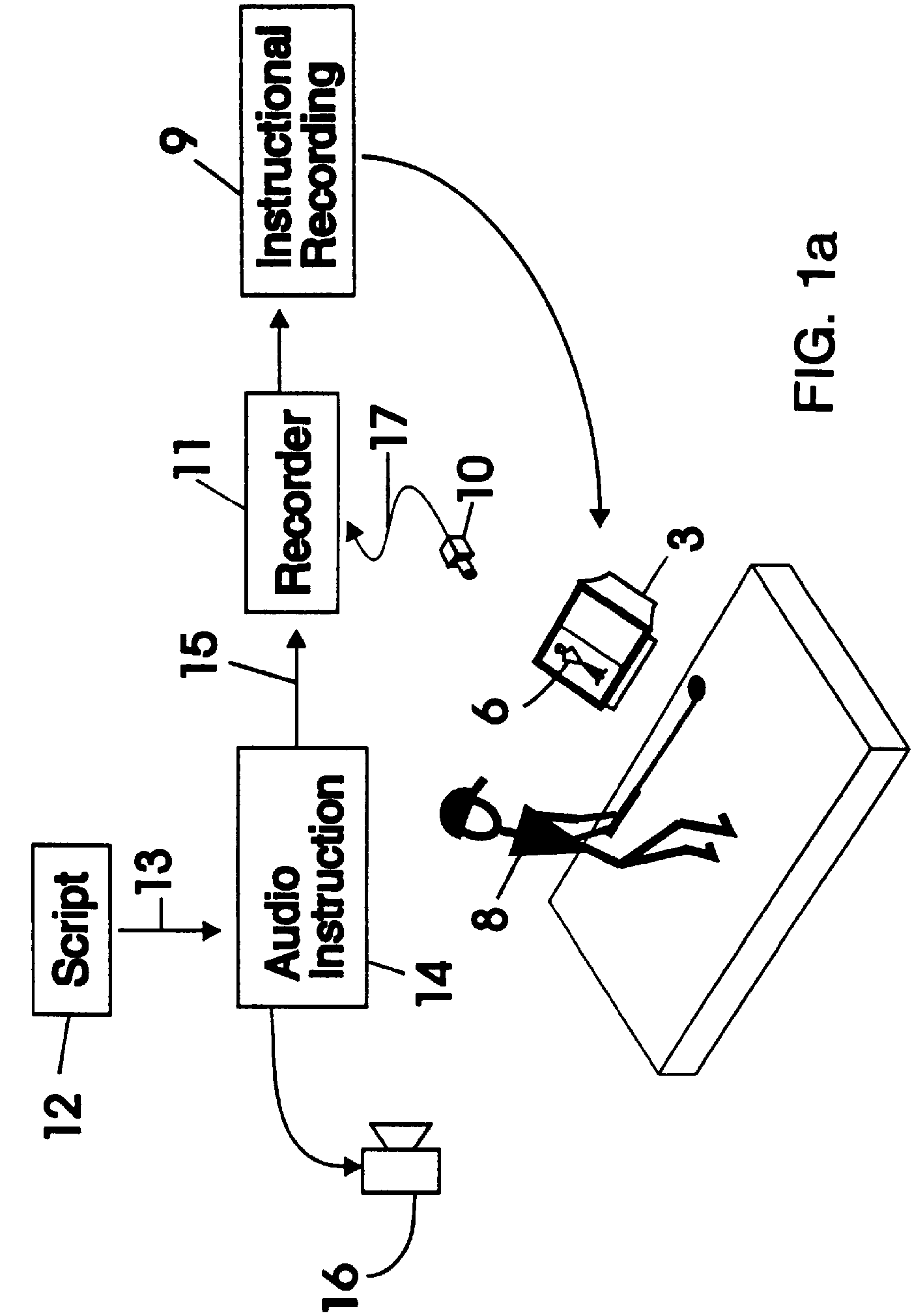
FIG. 1(*a*) is a schematic block diagram of the recordal of the golf lessons onto an instruction recording, FIG. 1(*b*) is a partial schematic block diagram of the recordal of the golf lessons onto an instruction recording using three monitors, with a camera positioned to the left hand side of a tutor, FIG. 1(*c*) is a partial schematic block diagram of the recordal of the golf lessons similar to FIG. 1(*b*) with the camera positioned to the front of the tutor, FIG. 2(*a*) is a schematic perspective view of a system of the preferred embodiment in use, FIG. 2(*b*) is a partial schematic perspective view of the system of FIG. 2(*a*) using one camera and three monitors, illustrated with the camera positioned to the front of the pupil, FIG. 2(*c*) is a partial schematic perspective view similar to FIG. 2(*b*), illustrated with the camera positioned to the left hand side of the pupil.
Figure 1B:
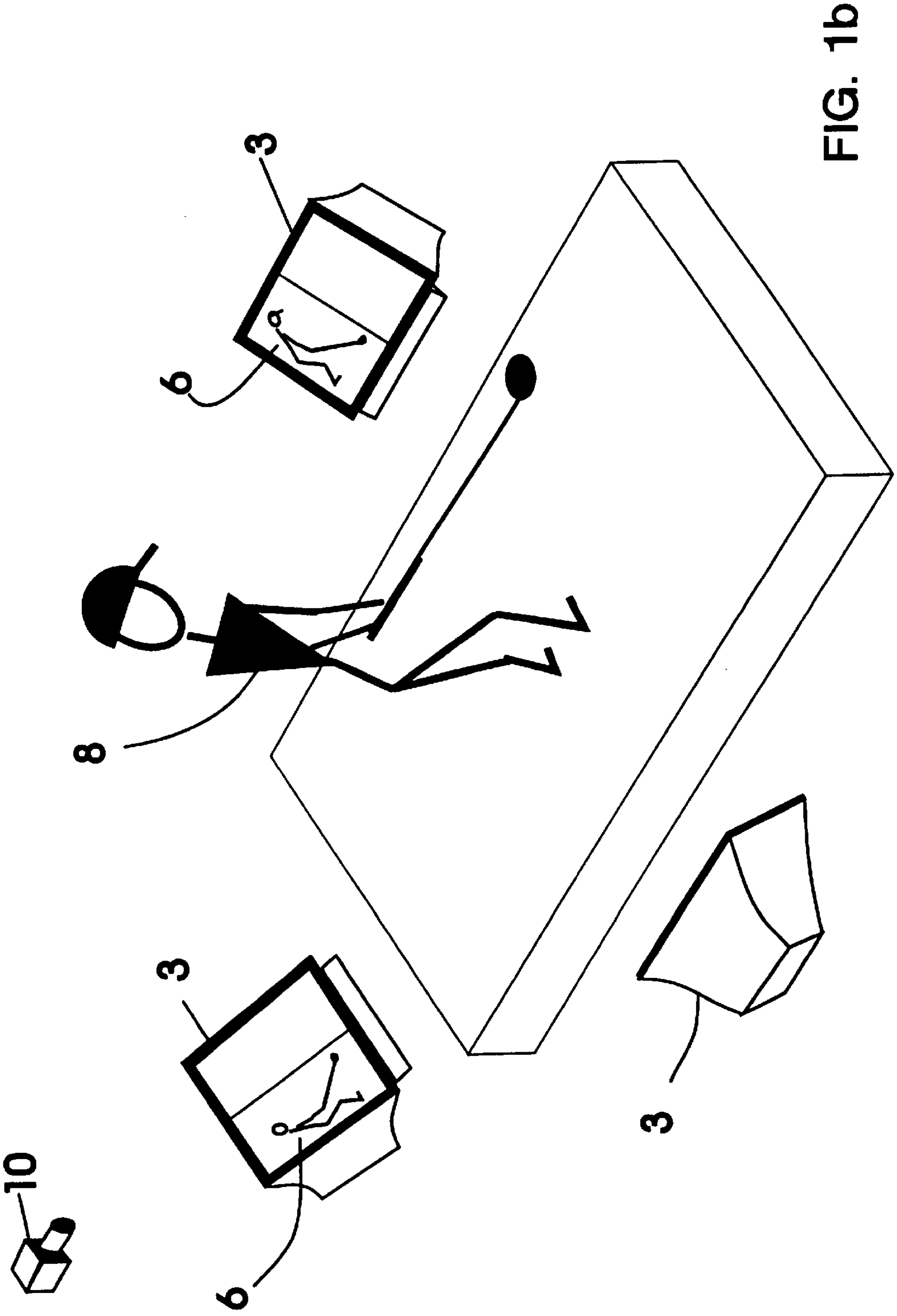
Figure 1C:
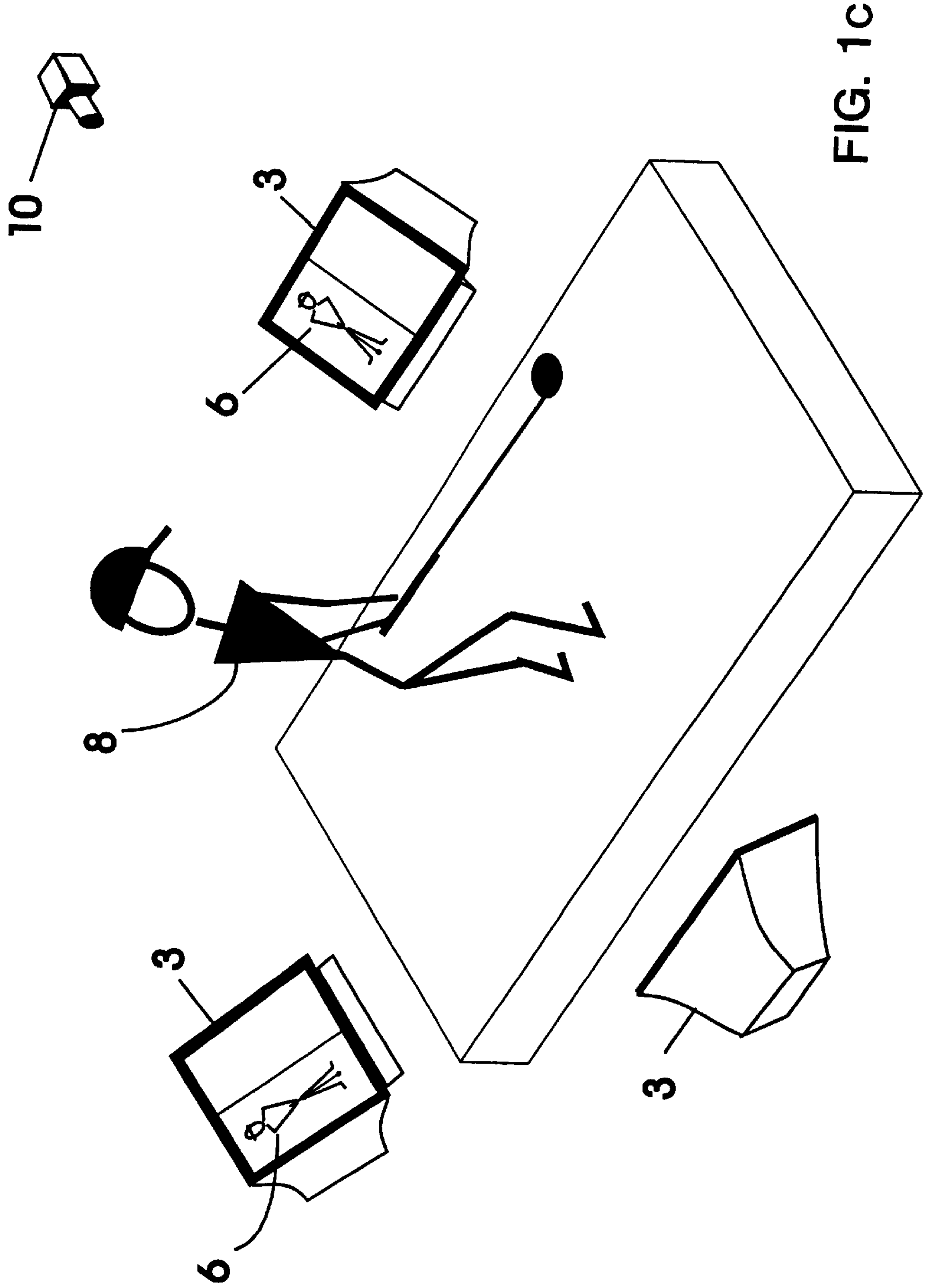
Figure 2A:
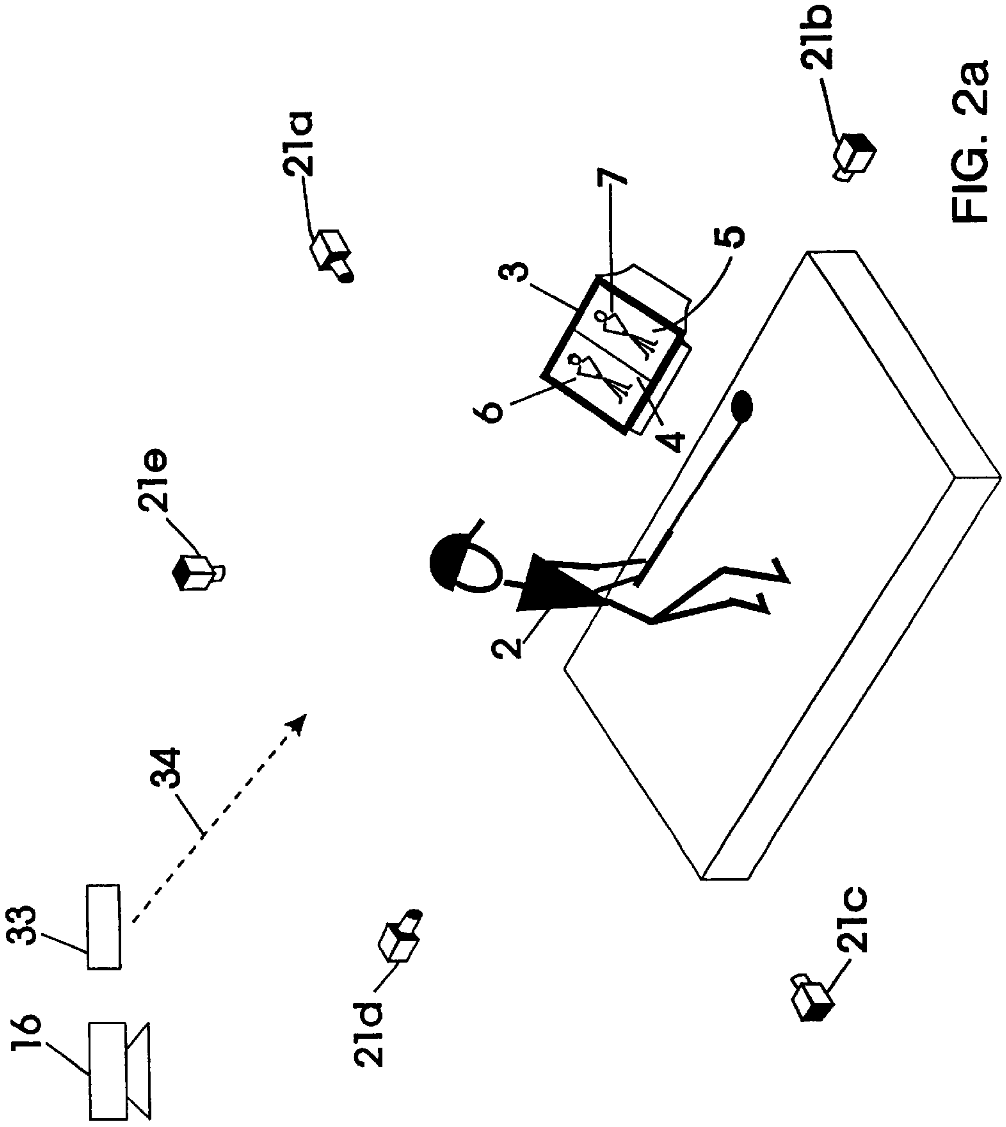
Figure 2B:
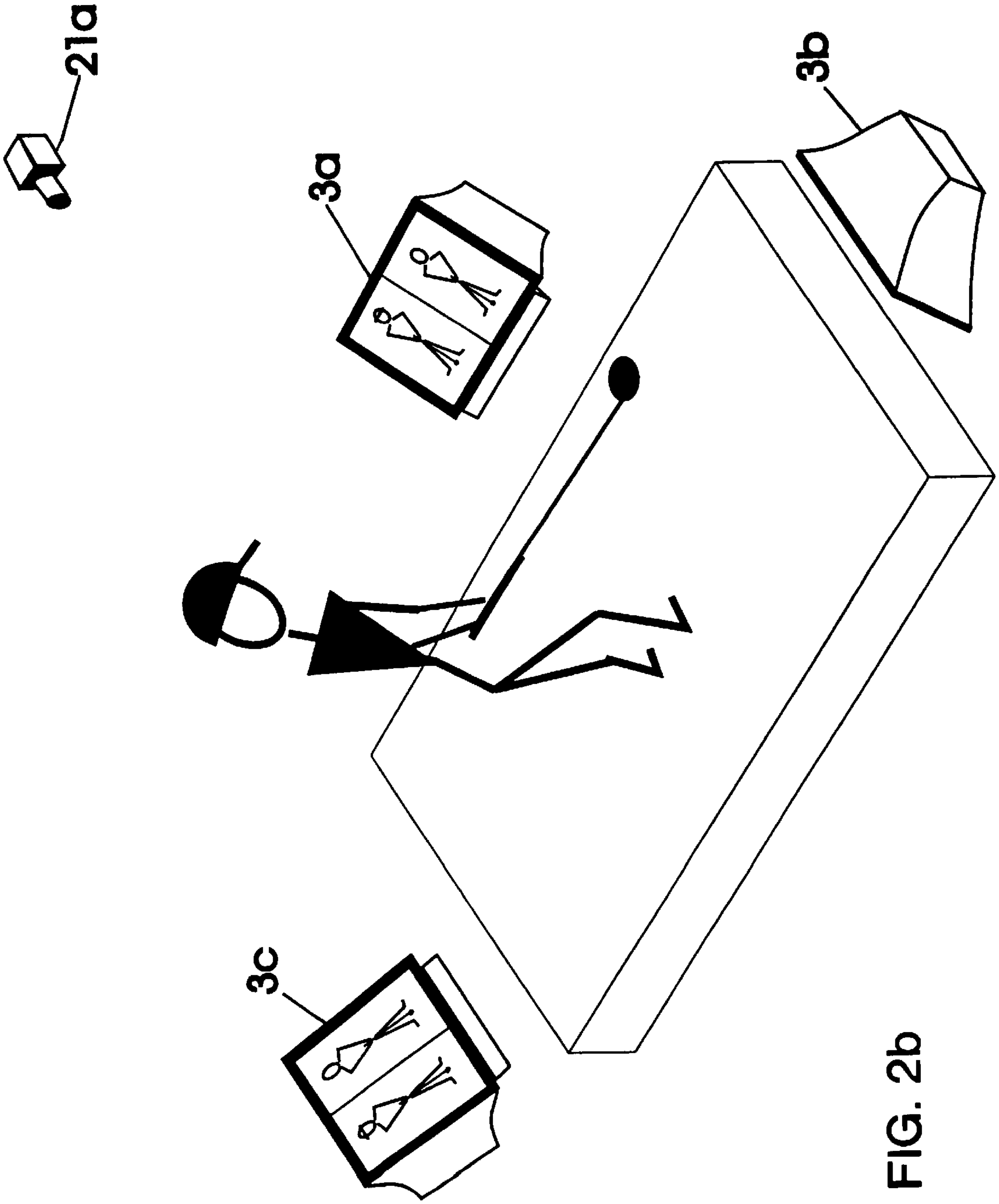
Figure 2C:
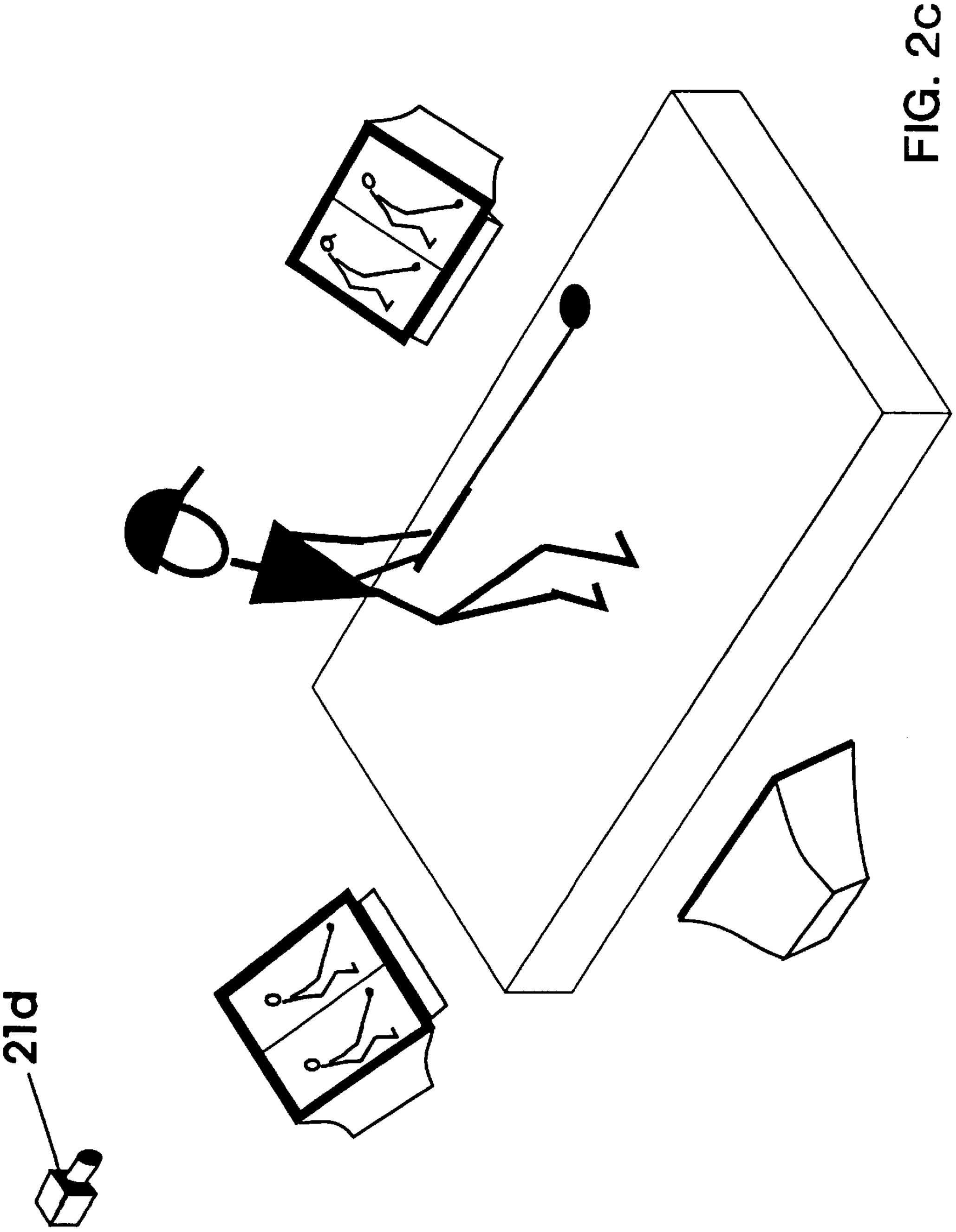
Figure 3:
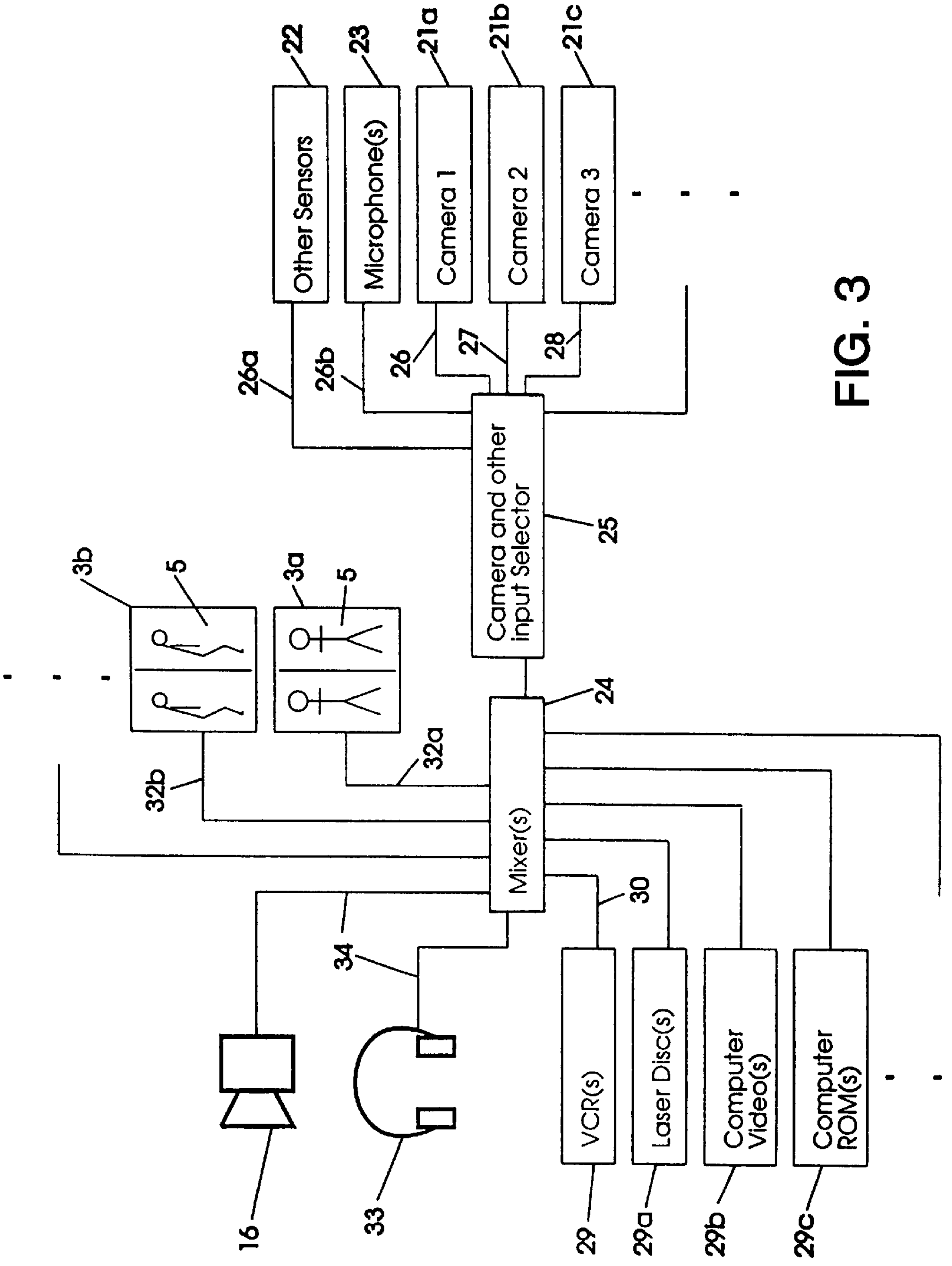
FIG. 3 is a schematic block diagram of the system of FIG. 2 in use.

A system 1 for instructions of a first preferred embodiment is illustrated in FIGS. 2 and 3 in respect of sports instruction. The system 1 being used by a pupil 2 includes a video monitor 3 which has a split screen facility. The video monitor 3 (for example as seen in FIG. 2(*a*)) has a dividing line 4 on the screen 5. The monitor 3 is used to show a first image 6 on one side of the screen 5 and a second image 7 on the other side of the screen 5. The first image 6 is that of an instructor 8 (previously recorded with the arrangement of FIG. 1(*a*)), whilst the second image 7 is that of the pupil 2, displayed in real-time, via a camera 21*a*.

Turning to FIG. 1(*a*), the first image 6 of the instructor 8 viewed by a recording camera 10, is recorded on an instruction tape 9 by a video cassette recorder 11. In other examples, the image 6 can be recorded on a disc or other type of device. The recording of the "lesson" by the instructor 8 is accomplished by providing a script which is typed into a personal computer (PC) 12. The PC 12 provides a signal 13 to a audio instruction voice synthesiser 14 which provides an audio signal 15 to the recorder 11 and also to a loudspeaker 16. The instructor 8 follows the instructions in the script as provided by the voice synthesiser 14. The instructions can also be provided by a voice recording on an audio tape or live narration, for example. As the instructor 8 completes the task as instructed, the recording camera 10 provides a video signal 17 to the video cassette recorder 11. The video signal 17 and the audio signal 15 are synchronously recorded on the instruction tape 9 ready for use. In FIG. 1(*a*), the instructor 8 is shown facing the recording camera 10, however, as different instructions are provided to him from the voice synthesiser 14, the instructor 8 changes his position as illustrated in FIGS. 1(*b*) and 1(*c*) to illustrate other views, e.g. side and front views as required. In these positions more than one monitor 3 can be used as compared with the arrangement of in FIG. 2(*a*). Corresponding instruction arrangements for the pupil 2 are shown in FIGS. 2(*b*) and 2(*c*). The instruction tape 9 can be edited using conventional techniques. A different instruction tape 9 is recorded for those different tasks or lessons which are to be used in the instruction of the pupil 2.

The system 1 as illustrated in FIG. 2(*a*) in addition to the video camera 21*a* which is positioned in the front of the pupil 2, includes further cameras 21*b*, 21*c*, 21*d* and 21*e* to the right, rear, left and above the pupil 2, respectively. As seen in FIG. 3, the video cameras 21*a*, 21*b*, 21*c*, 21*d* and 21*e*, are selectively connected to a mixer 24 by a camera selector 25. As an example, video signals 26, 27 and 28 from the cameras 21*a*, 21*b*, 21*c* respectively are selected according to the view required during the lesson. A playback recorder 29 plays back the instruction tape 9 and a playback video/audio signal 30 is supplied to the mixer 24 which provides a mixed signals 32*a*, 32*b* . . . to the television monitors 3*a*, 3*b* . . . respectively as selected and required. The mixed signals 32 each include the video/audio signal 30 of the instructor 8 and the selected video signals 26, 27 and/or 28 which are displayed simultaneously on the screen 5 as the first and second images 6 and 7, respectively. The camera selector 25 selects the correct video cameras 21*a,* 21*b,* 21*c* . . . according to the image 6 of the instructor 8 so that the second image 7 of the pupil 2 corresponds with the instructor 8.

The pupil 2 can wear a pair of headphones 33 or listen to a loudspeaker 16, each of which receive an audio signal 34 supplied by the mixer 24 as illustrated, or from one of the television monitors 3. The signal 34 can be conveyed as an infra-red signal or any appropriate telecommunication signal, such as by hard wire. The pupil 2 is able to stand in front of the television monitor 3 with the headphones 33 in place and receive the infra-red audio signal 34 or listen to the speaker 16 so that he follows the instructions contained on the instruction tape 9 and is able to compare his movement with the image of the instructor 8 on the other half of the split screen 5 without physical restriction. Pertinent parts of the instruction can be indicated by blinking arrows or cursor signs on the display or by an audible signal or tone.

The pupil 2 is instructed via the instructional figure to carry out any command or instruction received. As the instructional figure performs, so shall the pupil 2 attempt to emulate. A time lapse can be included in the instructions to allow the pupil 2 to emulate the instructor 8 after any given instruction received. Further time lapses can be included for "comment periods" of explanations on the instruction tape 9 as to the reasons of any given command. Rest and pause periods are provided in the instructions for demonstration purposes by the instructional figure.

Variations to the afore described system are that other sensors 22 and microphones 23 can also have corresponding signals 26*a* and 26*b* input to the mixer 24 via the selector 25 as illustrated in FIG. 3; and other recordings such as contained on laser disc(s) 29*a,* computer video(s) 29*b* and computer ROM(s) 29*c* can be used to supply the instruction signals 30. Where appropriate, the other sensors 22 can include pressure sensors, position sensors, velocity sensors and the like.

Figure 4:
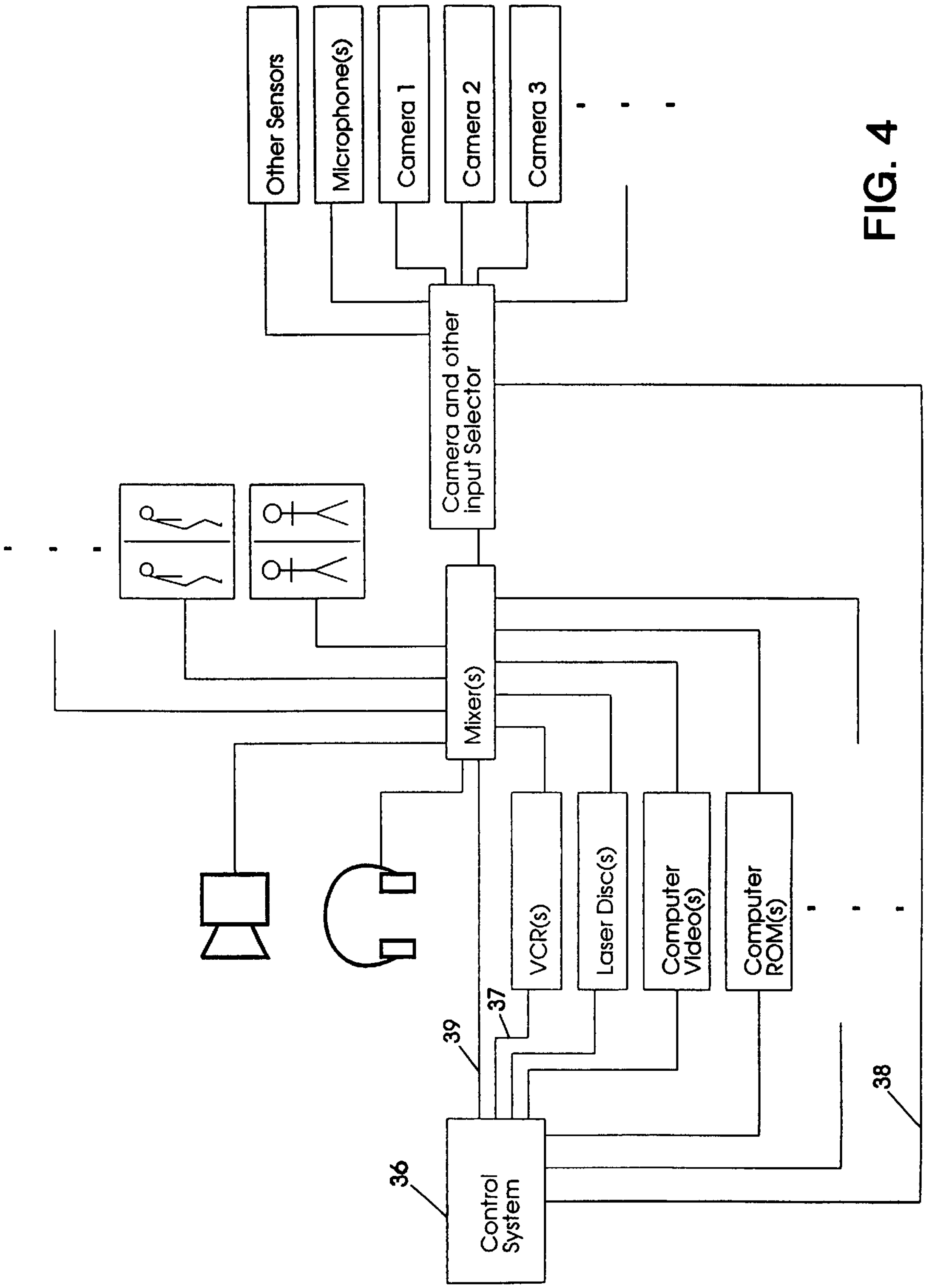
FIG. 4 is a schematic block diagram of a variation of the system of FIG. 3.

In a further variation of the system 1 as illustrated in FIG. 4, a computer control system 36 is used to provide control signals 37, 38 and 39 to the playback recorder 29, the camera selector 25, and mixer 24 respectively. All the other components of the system 1 are the same as that described in relation to FIGS. 2 and 3. The computer 36 is used to control the operation of the system 1.

A further variation in operation of the system of FIG. 3, the pupil image can be recorded on the VCR 29 when the instruction image is sourced from the laser disc 29*a,* for example. A debriefing can then follow the instructional session. Also, the instruction image can be recorded together with the pupil image by the VCR 29 which would permit further levels of instructional feedback at a debriefing or during the lesson by replaying all or part of the recorded 'lesson' to the pupil 2 during the 'lesson' session.

The system 1 is used by the pupil 2 so that the pupil 2 looks at the video monitor 3 to compare his stance and actions with that of the instructor 8 to thus emulate the instructor 8. A number of different tasks or lessons can be followed and learnt from a number of different instruction tapes 9.

The foregoing describes only some embodiments of the present invention, and modifications obvious to those skilled in the art can be made thereto without departing from the scope of the present invention.

For example, the system 1 uses a video monitor 3, however, such a monitor 3 can be replaced by a video projector to provide larger images for the pupil 2 to watch.

The one video monitor 3 and three video cameras 21, 22 and 23 can be replaced by a single camera and three video monitors. In such an arrangement, the video monitors are arranged at different angles in relation to the camera and as the pupil turns toward the different video monitors, the angle viewed by the camera of the pupil changes accordingly.

In the preferred embodiment described above, the system 1 uses audio signals, however, the system could be used without sound and just be used with a visual comparison.

The system 1 has been described with reference to golf instructions, however, the system 1 can be used to instruct in other sports such as baseball, cricket, tennis and the like, and in other fields such as medicine, industry, etc.

In another modification, the first image 6 of the instructor 8 is recorded on a compact disc or other means (not illustrated) instead of on an instruction tape.

Another modification of the system as described above is to use the electronic recording arrangement to modify the image 6 of the instructor 8 by producing an outline of the instructor only or by rendering his image faint or translucent. This is accomplished by using known techniques of video editing. The system as modified using known techniques merges the outlined image of the instructor 8 and the image 7 of the pupil 2. In this way the pupil 2 can compare his stance and actions with that of the modified image of the instructor 8 as the two images are superimposed.

The system of the preferred embodiment has been described with regard to the instruction of a pupil learning golf. The system as described can also be used in gelds other than sports instruction. For example, teaching a variety of disciplines where action and movement of limbs or equipment occurs. One such field is in teaching actions and procedures for surgeons and physiotherapists.

Another field of use of the system is in education. The system can be used to teach writing, and can be used to assist in the teaching of deaf pupils to talk after comparing their actions with that of an instructor.

The system can use a screen that is split into as many sections as required to produce the desired number of illustrations, eg. head or part thereof, torso, limbs, hands, objects as necessary to instruct, writing, printing, numerals, symbols, designs, medical science, industrial productions, translations, languages, the arts, paintings and drawings, to name just a few. Any or all parts of the screen can be integrated using conventional techniques with audio overlay, speech or other sound, synthesised or otherwise for the instructional part of the screen.

The pupil can emulate by sight, by sound, by writing, the spoken word, expression of lips, limbs, or whatever part(s) of the body or tools that are applicable.

The system has been described above with respect to conventional video, but is applicable to other technology, such as programmed emulation instructions.

Once such computer technology which is known as "virtual reality" in which the pupil wears a multi dimensional viewing apparatus (for example goggles) and can "wear" additional apparatus to allow stimulation of his other senses which allows the pupil to be positioned within a "virtual landscape". The pupil could wear sensors, which feed signals into the system to indicate the movement of the pupil. The instructor's motions and instructions have already been programmed into the system or recorded by other means, and the pupil can emulate the instructor whilst being in the multi dimensional "virtual space". In such a system all angles of instruction are covered. For example, left, right, front, rear, top, bottom. Pertinent parts of the instruction can be accentuated with blinking arrows or cursor signs in the display goggles or other display, or by audible tones or by stimulating any of the pupils senses.

The virtual reality method of presentation can provide up to complete sensory feedback as it can stimulate all the senses of the body; ie. sight, sound, smell, touch, and taste as appropriate or required.

For virtual space, information about the instructor (his or her image) can be placed next to or superimposed over the student.

In some applications, lessons can be supplied in a remote manner, via cable television lines, optical fibres or satellite networks that permit interactive viewing.

I claim:

1. A system for instruction of a pupil in a physical movement, said system comprising:

(a) audio reproduction apparatus for delivering a series of prerecorded audible instructions to the pupil during a course of instruction;

(b) at least one video display apparatus to display in a comparing relationship tutor and pupil images;

(c) a mixer to receive a first pre-recorded instructional image of a tutor other than the pupil from a first source and a second image from a second source, said second image providing a real time image of the pupil, wherein the output of said first and second sources are connected to said mixer to display simultaneously said images in split-screen juxtaposition respectively on said display apparatus so the pupil may view the first image and attempt to emulate the said first instructional image following the pre-recorded audible instructions and said first image.

2. The system of claim 1 wherein said system is a system for instruction of golf.

3. The system of claim 1 wherein said video display apparatus includes a video monitor having a split screen to show said images simultaneously in side-by-side relationship.

4. The system of claim 1 wherein said second source includes at least one camera from which at least one of said pupil images is obtained.

5. The system of claim 1 wherein said second source comprises a plurality of cameras positioned at various locations relative to the pupil, each camera being selectively connected to said mixer by a camera selector.

6. The system of claim 1 wherein said first source comprises a video play-back arrangement selected from a group consisting of a tape player or a laser disc player.

7. The system of claim 1 wherein said tutor image of said instructor is a synthesized image produced by a computer serving as said first source.

8. The system of claim 1 wherein said display apparatus comprises a plurality of video monitors positioned relative to said pupil, each of said monitors being selectively connected to said second source by said mixer.

9. The system of claim 1 wherein said first source includes an audio recording reproducible via said audio reproduction apparatus to which the pupil may listen to receive instructions while emulating the instructional image.

10. The system of claim 9 wherein said audio recording is transmitted to the pupil by a loud speaker.

11. The system of claim 10 wherein said loud speaker includes a set of head phones arranged to receive an audio signal carrying said audio recording, said head phones being wearable by said pupil.

12. The system of claim 1 further including an electronic control device operable to control the operation of the system.

13. The system of claim 1 wherein said video display apparatus is positioned in the normal line of sight of the pupil when the pupil assumes a position to emulate the instructional image.

14. The system of claim 2 wherein said video display apparatus is positioned at a location below the knees of the pupil when the pupil assumes a golf stance.

15. The system of claim 1 wherein said first instructional image includes audible instructional pauses and prompts.

16. The system of claim 1 further including means for sensing physical motions of the pupil as the pupil attempts to emulate the instructional image.

17. The system of claim 1 wherein said video display apparatus is a large projection television monitor.

18. The system of claim 1 further including a platform on which the pupil is positioned as the pupil attempts to emulate the instructional image.

* * * * *